July 20, 1965 A. V. BEDFORD 3,196,205

COLOR TELEVISION CAMERA SYSTEM

Filed June 27, 1961 2 Sheets-Sheet 1

INVENTOR.
ALDA V. BEDFORD
BY Floyd M. Harris
Attorney

July 20, 1965 A. V. BEDFORD 3,196,205

COLOR TELEVISION CAMERA SYSTEM

Filed June 27, 1961 2 Sheets-Sheet 2

INVENTOR.
ALDA V. BEDFORD
BY Floyd M. Harris
Attorney

United States Patent Office 3,196,205 Patented July 20, 1965

3,196,205
COLOR TELEVISION CAMERA SYSTEM

Alda V. Bedford, Princeton, N.J., assignor to Radio Corporation of America, a corporation of Delaware Filed June 27, 1961, Ser. No. 119,871
17 Claims. (Cl. 178—5.4)

Figure 1:
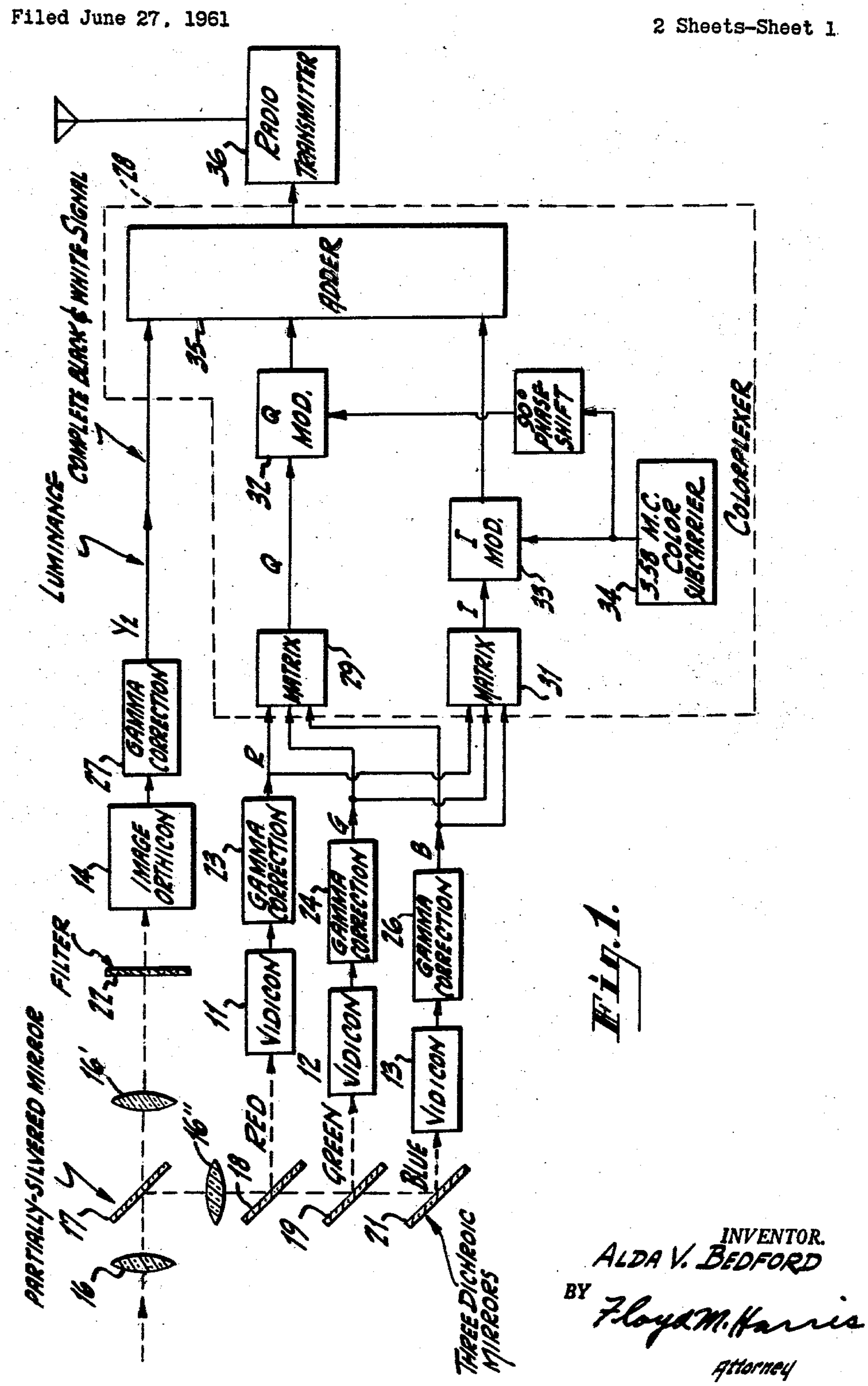

This invention relates to color television systems, and particularly to improved apparatus for picking up and transmitting scenes for either black and white or color reproduction at the receiver.

Present practice is to pick up a scene with a color camera that comprises three pickup tubes, such as image orthicons, the three tubes supplying, respectively, signals corresponding to three primary colors red, green and blue. Color difference signals are produced and transmitted on a color subcarrier. A luminance or brightness signal is also produced and transmitted. The luminance signal is produced by adding the three color signals in the proportions 0.30, 0.59 and 0.11 corresponding respectively to the relative luminances of the red, green and blue primaries used. The resulting luminance signal is satisfactory providing the three color tubes are in good registration.

If there is an error in the registration of the three color pickup tubes, the resolution of the reproduced picture is degraded. This is true whether the scene is being reproduced in color or in black and white. Degradation of the resolution is particularly noticeable in black and white reproduction since all picture information is derived from the luminance signal.

Kell Patent 2,750,439 describes a color television system employing three picture pickup tubes in which poor resolution due to poor color pickup tube registration is avoided. This is accomplished by obtaining a complete black and white picture signal from one of the pickup tubes and employing this signal as the luminance signal. The Kell system, however, is, for reasons explained later, deficient in the color hue fidelity that is obtained.

In practicing the present invention, four picture pickup tubes are employed. Three of the pickup tubes are vidicons which supply, respectively, the red, green and blue signals from which desired color-difference signals may be derived. Vidicons are tubes of the type having a photoconductive target or screen that is to be scanned by an electron beam. The fourth pickup tube is a high resolution tube such as an image orthicon which supplies the brightness or luminance signal. Because the luminance signal is not derived from the three color signals which may be in poor registration, it may be reproduced as a high resolution picture in a black and white receiver. Similarly, it may be reproduced in a color receiver as a high resolution black and white image on which the comparatively low resolution red, green and blue color-difference components of the scene may be superimposed. In the latter case, the net visual effect is that of a good high resolution color picture, providing the colors are correct.

In the system of the present invention there is good color fidelity, both in hue and saturation. At the same time, the system is suitably gamma corrected. Furthermore, the color picture is free from false color shading at low light levels commonly caused by undesirable background spots and shading such as present in image orthicons and other high resolution pickup tubes since vidicons are substantially free from such background spots and shading. It should be appreciated that if the individual color pickup tubes had spurious shadings differing from one another it would cause non-uniform hue reproduction across the picture, which is more objectionable than spurious shading in luminance only. The fact that the vidicons supply comparatively low resolution color signals, and that a color may tend to smear because of vidicon storage or lag when there is movement in the scene, is acceptable because the smearing is subjectively masked by the high resolution image supplied by the luminance signals. Further, the effect of color lag is not present in black and white reproduction of the transmitted color signal.

The present invention provides a color system that utilizes the different desirable characteristics of two different types of pickup tubes, namely, a high resolution tube such as the image orthicon to provide a high resolution picture and the comparatively low resolution vidicons which provide a picture with a uniform, clean unspotted background. Further advantage of convenience and economy results from the simplicity, small size and low cost of the three-low-resolution color pickup tubes, including their associated operating gear.

Figure 2:
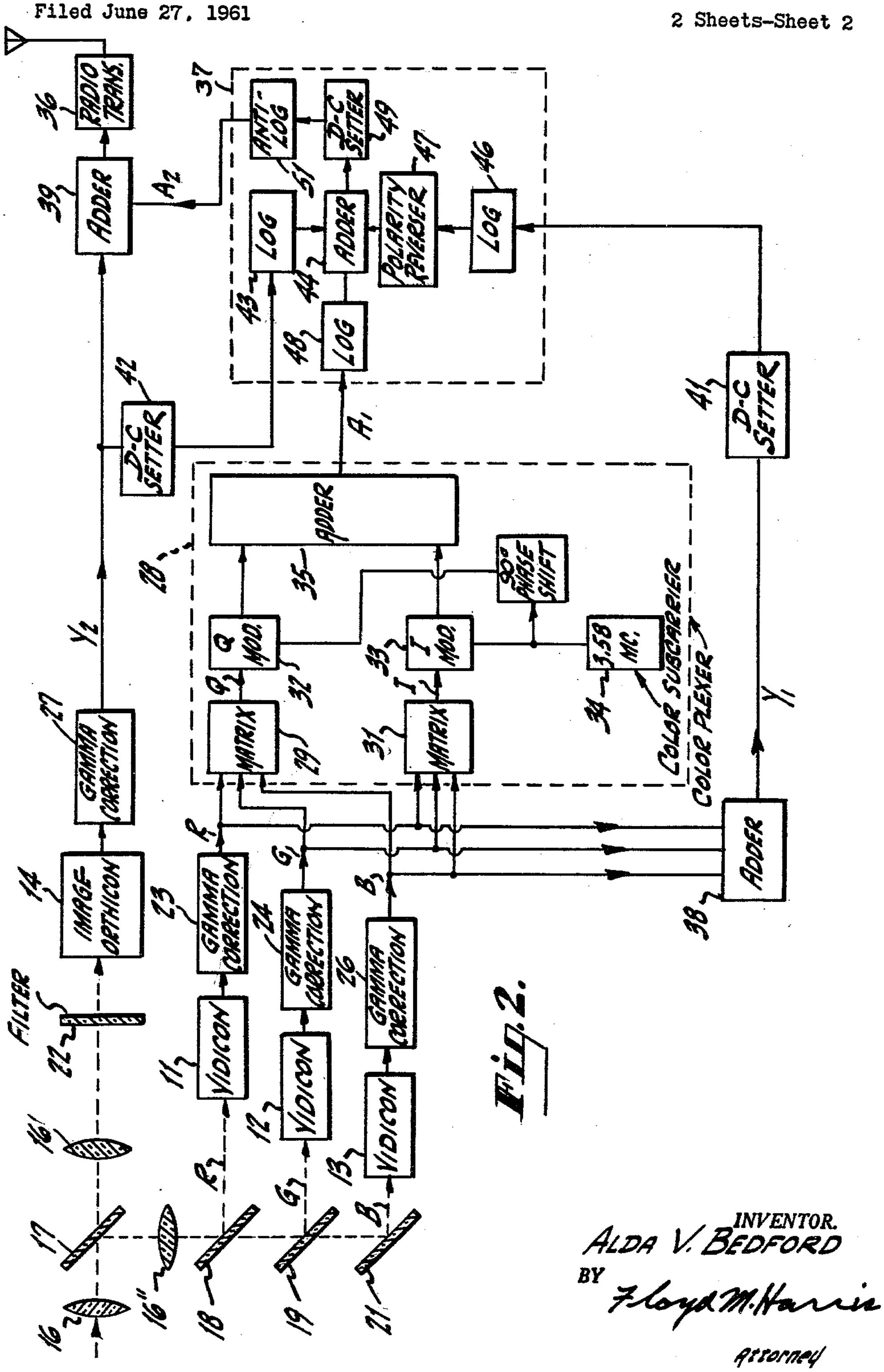

The invention will be described in detail with reference to the accompanying drawing in which:

FIG. 1 is a block and schematic diagram illustrating one embodiment of the invention, and FIG. 2 is a block and schematic diagram illustrating another embodiment of the invention.

In the several figures like parts are indicated by similar reference characters.

In FIG. 1 the color camera comprises three vidicons 11, 12, and 13, and a high resolution pickup tube 14 which which may be an image orthicon. As an example of pickup tubes that may be used, the vidicons may be the RCA 7735 with 1 inch diameter bulb and the image orthicon may be the RCA 7295A with 4½ inch diameter bulb. The scene to be transmitted is imaged on the pickup tubes by an optical system indicated schematically at 16, 16′, 16″. A suitable partially silvered mirror 17 transmits a portion of the light, such as about 20%, to the image orthicon and reflects the remaining light to suitable means, such as dichroic mirrors 18, 19, 21, which transmit the red, green, and blue light components to the vidicons 11, 12 and 13, respectively.

One suitable optical and dichroic mirror system that may be employed to suitably image the scene on the three vidicons is shown in Sachtleben et al. Patent 2,672,072. Using this system, the scene may be imaged on the image orthicon by positioning a partially silvered mirror at 45 degrees between the field lens and the image-relaying apparatus of Sachtleben et al. to direct about 20 percent of the light toward the image orthicon. In the path of this light there may be placed another image-relaying apparatus which may be the same as that in the path of the light going to the vidicons except that it is designed to form the proper size image on the image orthicon, this image being larger than the image formed on the vidicons.

If desired, the light going to the image orthicon may be passed through an optical filter 22 which has a characteristic such that in combination with the image orthicon the spectral response is comparable to the luminance sensitivity of the human eye for the various wave lengths. The filter 22 may be omitted, particularly if the image orthicon itself has such a spectral response.

Suitable gamma correction may be provided for each pickup tube as indicated by the blocks 23, 24, 25, 27 and the legends. It has been found, however, that the pickup tube characteristics themselves provide sufficient gamma correction for generally acceptable reproduction at the receiver without the use of external gamma correction circuits. The reason for this is that the vidicons have a light vs. signal output characteristic that corrects approximately for the receiver picture tube characteristic, and that the image orthicon, in the example assumed, is operated on the upper bend (the knee) of its characteristic where the curvature is such that it also corrects approximately for the receiver picture tube characteristic. This operation on the knee of the image orthicon characteristic also results in an apparently sharper picture.

The gamma corrected signals from the three vidicons and the image orthicon are fed into a colorplexer 28 which may be the RCA colorplexer type TX–1C. The colorplexer comprises a matrix 29 to which the red, green and blue signals from the vidicons are applied to form the Q color difference signal, and a matrix 31 to which the same signals are applied to form the I color difference signal. The Q and I signals are applied to modulators 32 and 33, respectively, where they modulate the color subcarrier supplied from source 34. The subcarrier supplied to the Q modulator 32 is shifted in phase 90 degrees with respect to the carrier supplied to the I modulator 33.

The outputs of the I and Q modulators carrying the color difference signals are added in an adder 35 to form the phase and amplitude modulated color subcarrier. The gamma corrected signal $Y_2$ from the image orthicon 14, which signal is utilized as the luminance signal, is added to the color subcarrier in the adder 35. The red, green and blue color signals and the luminance signal $Y_2$ are fed into the colorplexer at the same points that the color signals and the luminance signal are fed into the colorplexer when the camera is the customary type of three pickup tube camera, such as RCA TK–12, wherein the luminance signal is obtained by adding the three color signals.

The output of the adder 35 is supplied to a transmitter 36 where it modulates the carrier wave that is transmitted. The transmitter is of the type that transmits color television signals in accordance with present FCC standards. At the receiver, the decoder samples the color subcarrier signal to produce other color difference signals, namely, $R-Y$, $G-Y$ and $B-Y$. These signals are then added to the received Y signal to produce red, green and blue signals which are applied respectively to the red, green and blue image reproducing elements, which generally are three separate cathode-ray guns in a single color picture tube.

In my four-tube camera of FIG. 1 the spurious shading signals of the image orthicon or other high resolution tube employed do not affect the color hue since the color hue is determined by the three vidicons. In the camera of the above-mentioned Kell patent, which uses the high resolution tube in the process of obtaining the third color, such spurious shading signals do affect the color hue and therefore tend to degrade the color hue fidelity.

Also, in my four-tube camera of FIG. 1 suitable gamma correction can be provided in a simple effective way without degrading the color fidelity. Specifically, the gamma correction is provided by the pickup tube characteristics or by gamma correction immediately following the pickup tubes, or by gamma correction at both of these locations, and there is no resulting color hue degradation. In the camera of the Kell patent a color hue error is introduced by any gamma correction incorporated in or immediately following the pickup tubes. This will be seen from the following:

In the Kell camera green is obtained by subtracting red and blue from the Y signal, that is, $G=Y-R-B$. If there is gamma correction, say to the ½ power, provided in the simple way referred to above, then $G=(R+G+B)^{1/2}-R^{1/2}-B^{1/2}$. There obviously is a color hue error since this is not the same as $$G=(R+G+B)-R-B$$

My four-tube camera also has the advantage that it is comparatively easy to adjust for gamma correction without introducing color error. Specifically, the tubes (vidicons) that should be made to track in gamma are identical tubes. This tracking for similar or identical tubes is inherently more accurate than the tracking obtained when it is attempted to make unlike tubes track in gamma. Thus, the initial adjustment is better and, also the tracking will be better when adjustments in gain or gamma are made.

Because of using the output of the image orthicon (i.e., using the entire picture signal) as the luminance signal, the luminance signal $Y_2$ obtained with my four-tube camera is not the exact luminance signal that the color receiver calls for. However, as will now be discussed, this luminance signal $Y_2$ is generally acceptable. Furthermore, as will be later explained in connection with FIG. 2, any departure from the precisely correct luminance signal may be compensated for if more exact color reproduction is desired.

The non-linear relation between the control grid voltage (measured from a negative bias value) of a cathode ray gun and the light output of a typical picture tube may be roughly described as a power law, that is: light$=e^{\gamma}$ where the exponent $\gamma$ (the Greek letter "gamma") is known as the "gamma" characteristic of the tube and generally has a value between 2 and 2.7. Then to obtain a linear relation between the scene brightness and light output of a monochrome picture tube the transmitted signal would be "gamma corrected" by raising a linear camera tube luminance signal to the power $1/\gamma$. For monochrome reception it is not important that the gamma correction match the receiver gamma very accurately since the effect of a mis-match is about the same as though the scene has been illuminated by a different ratio of diffused (or "flat") lighting to the point-source (or "contrasty") lighting.

In the case of color transmission the color receiver decodes the color subcarrier (or chrominance signal) to obtain the three color difference signals $(R-Y_1)$, $(G-Y_1)$ and $(B-Y_1)$, where the values of the constituents R, G and B were each gamma corrected and the constituent $Y_1$ which results inherently from the method of generating the so-called "constant-luminance" color subcarrier is equal to:

$$Y_1=.30R+.59G+.11B=.30R_0^{1/\gamma}+.59G_0^{1/\gamma}+.11B_0^{1/\gamma}$$

where $R_0$, $G_0$, and $B_0$ represent the linear color signals. The subscript on $Y_1$ indicates that this particular luminance signal has the composition shown by the equation above. If part of the gamma correction is in the pickup tube the linear color signal values will exist only in theory. In the standard three-pickup tube camera the luminance signal $Y_1$ which is transmitted and received separately from the subcarrier is produced by adding the gamma corrected R, G, and B camera signals in the same proportions, namely, .30, .59 and .11. Then when $Y_1$ is added to each of the color difference signals in the receiver it reproduces each of the original gamma corrected color signals which are applied to the respective color guns having the complementary "gammas." Thus, taking red for example:

$$(R-Y_1)+Y_1=R$$

Reproduction of both the luminance and color is therefore correct because each of the three guns is effectively driven by its own gamma-corrected camera pickup signal.

In my four-tube camera of FIG. 1 the color difference signals $(R-Y_1)$, $(G-Y_1)$ and $(B-Y_1)$ are formed in the colorplexer the same as in the standard three-tube camera. However, the luminance signal transmitted $Y_2$ is produced by raising the output of the image orthicon to the power $1/\gamma$. The linear spectral response of the image orthicon preferably is such as to be substantially equivalent to the signal $(.30R_0+.59G_0+.11B_0)$. When this signal is raised to the $1/\gamma$ power we get $$Y_2=(.30R_0+.59G_0+.11B_0)^{1/\gamma}$$

which is rigorously equal to $$Y_1=.30R_0^{1/\gamma}+.59G_0^{1/\gamma}+.11B_0^{1/\gamma}$$

only when $R_0=G_0=B_0$ which corresponds to black, white, and gray areas of the picture. To compare values of $Y_1$ and $Y_2$ for various color areas consider some examples, assuming $\gamma=2$ for ease of calculation:

Case 1: A gray area where $R_0=G_0=B_0=.5$ $$Y_1=(.30\sqrt{.5}+.59\sqrt{.5}+.11\sqrt{.5})=.707$$

and $$Y_2=[(.30\times.5)+(.59\times.5)+(.11\times.5)]^{1/2}=\sqrt{.5}=.707$$

Case 2: A yellowish green area where $R_0=.3$, $G_0=.5$ and $B_0=.1$ $$Y_1=.3\sqrt{.3}+.59\sqrt{.5}+.11\sqrt{.1}=.615$$
$$Y_2=[(.3\times.3)+(.59\times.5)+(.11\times.1)]^{1/2}=.662$$

Case 3: A red area where $R_0=.5$, $G_0=.1$ and $B_0=.1$ $$Y_1=.30\sqrt{.5}+.59\sqrt{.1}+.11\sqrt{.1}=.433$$
$$Y_2=[(.3\times.5)+(.59\times.1)+(.11\times.1)]^{1/2}=.469$$

Case 4: A purplish blue area where $R_0=.3$, $G_0=.1$ and $B_0=.5$ $$Y_1=.3\sqrt{.3}+.59\sqrt{.1}+.11\sqrt{.5}=.164+.187+.078=.449$$
$$Y_2=[(.3\times.3)+(.59\times.1)+(.11\times.5)]^{1/2}=(.09+.059+.055)^{1/2}=\sqrt{.204}=.451$$

Case 5: A blue area where $R_0=.1$, $G_0=.1$ and $B_0=.5$ $$Y_1=.3\sqrt{.1}+.59\sqrt{.1}+.11\sqrt{.5}=.360$$
$$Y_2=[(.3\times.1)+(.59\times.1)+(.11\times.5)]^{1/2}=.379$$

Case 6: A green area where $R_0=.1$, $G_0=.5$ and $B_0=.1$ $$Y_1=.3\sqrt{.1}+.59\sqrt{.5}+.11\sqrt{.1}=.537$$
$$Y_2=[(.3\times.1)+(.59\times.5)+(.11\times.1)]^{1/2}=.58$$

Case 7: A pure (impossible) blue area where $R_0=0$, $G_0=0$ and $B_0=.5$ $$Y_1=.11\sqrt{.5}=.0778$$
$$Y_2=\sqrt{.11\times.5}=.234$$

From Cases 1 to 6 for low and practicable high saturations, it appears that $Y_2$ is reasonably close to the conventional signal $Y_1$. For Case 7 the error in using $Y_2$ would be large but the original scene cannot have a saturation nearly this high. A color having a saturation higher than Case 6 would not occur in practice except at extremely low light values, where even great percent errors would not be seen.

The difference between $Y_2$ and $Y_1$ is an error voltage which is added to each of the guns in the color tube. The direct effect upon the picture is to change the relative brightnesses since it changes all three guns in the same direction. As previously explained the observer is relatively unconcerned by this effect. However the error will have some effect upon color saturations since it alters the *ratio* of the luminance signal to the color subcarrier. It will also have a slight effect upon color hue. Tests have been made which indicate that the net errors in the circuit of FIG. 1 will be subjectively small compared with error caused by system misadjustments as the art is now practiced and hence can be tolerated.

For television systems where more exact color reproduction is desired, hue and saturation errors may be corrected as illustrated in FIG. 2.

The error correction provided by the circuit shown in FIG. 2 is based on the fact that in a color system of the type described the reproduced color saturation or chroma corresponding to any instantaneous value of received luminance signal is determined by the relative value of the color subcarrier. More specifically, it is determined by the peak-to-peak amplitude of the color subcarrier relative to the amplitude (value) of the luminance signal at any instant.

Therefore, if a luminance signal $Y_2$ is used that has a value in the receiver which at any instant differs from the color-ideal luminance signal $Y_1$ by a ratio $Y_2/Y_1$, the color subcarrier should be corrected by suitable means in the same ratio in order for the receiver to provide exactly the same hue and color saturation as would have been reproduced using $Y_1$, but at the different luminance prescribed by $Y_2$.

The system of FIG. 2 is the system of FIG. 1 plus the correction means. The luminance signal that is to be transmitted is the signal from the image orthicon as explained in connection with FIG. 1. It will be identified as luminance signal $Y_2$. The color-ideal luminance signal is $Y_1$. This is referred to as the "color-ideal" luminance because it is the luminance transmitted for correct color reproduction. In FIG. 2 the value of the color subcarrier is changed by multiplying it by the ratio of the instantaneous value $Y_2/Y_1$ in a multiplying unit 37. Thus, if the original value (peak-to-peak amplitude) of the color subcarrier is $A_1$ the transmitted value is:

$$A_2=A_1\times Y_2/Y_1$$

Since the color demodulator in the receiver is linear in its action, the color difference signals produced in the receiver are correspondingly changed in the same ratio $Y_2/Y_1$ so that the signals applied to the three guns of the picture tube are respectively:

$$R=(R_1-Y_1)Y_2/Y_1+Y_2=R_1(Y_2/Y_1)$$
$$G=G_1(Y_2/Y_1)$$
$$B=B_1(Y_2/Y_1)$$

It is evident that each signal is changed in the same proportion. Now if the picture tube has a gamma of 2, for example, the light outputs are, respectively:

$$L_R=K(R_1Y_2/Y_1)^2=R_1^2K(Y_2/Y_1)^2$$
$$L_G=G_1^2K(Y_2/Y_1)^2$$
$$L_B=B_1^2K(Y_2/Y_1)^2$$

where K is a constant.

Thus the light produced under the control of each gun of the picture tube is changed by the same factor $(Y_2/Y_1)^2$, resulting in a change in luminance characteristic but no change in the color hue or saturation. Since the phase of the color subcarrier is unchanged, there is no change in hue due to such phase change. Only the gamma or contrast of the picture is changed, that is, the color or objects in the picture appear correct but it may appear that the lighting of the subject has been changd in regard to geometric distribution of lamps, etc. without change in the color of light produced by the lamps.

Referring to FIG. 2, an example of a suitable circuit for multiplying the color subcarrier $A_1$ by $Y_2/Y_1$, and thereby providing the desired correction, will be described. The color-ideal luminance signal $Y_1$ is derived by obtaining R, G and B signals from the gamma corrected outputs of the vidicons and adding them at 38 in the proportions $0.3R+0.59G+0.11B=Y_1$ in the usual way. The gamma corrected signal from the image orthicon 14, however, is to be transmitted as the luminance signal. Thus it is the luminance signal $Y_2$ that is added at 39 to the corrected color subcarrier $A_2$ and transmitted.

To obtain the subcarrier $A_2$ the luminance signal $Y_1$ is applied to the multiplier 37 after having its direct current component restored by a direct-current setter 41. The luminance signal $Y_2$ is also applied to the multiplier 37 after having its direct current component restored by a direct-current setter 42. The operation of the multiplier 37 will now be explained. The logarithm of $Y_2/Y_1$ is obtained by subtracting the logarithm of $Y_1$ from the logarithm of $Y_2$. This is done by passing $Y_2$ through a logarithmic circuit 43 to an adder 44, and by passing $Y_1$ through a logarithmic circuit 46 and a polarity reverser 47 to the adder 44. To obtain the logarithm of $A_1Y_2/Y_1$, the signal $A_1$ is passed through a logarithmic circuit 48 to the adder 44.

The output of adder 44, which is the logarithm of $A_1Y_2/Y_1$, is passed through a direct-current setter 49 to an anti-logarithm circuit 51 which supplies the signal $A_2 = A_1 Y_2 / Y_1$. This is the corrected color subcarrier which is supplied to the adder 39 where it and the luminance signal $Y_2$ are added for transmission to the receiver.

The logarithmic circuits 43, 46 and 48 may be any of the well known types wherein the circuit output is proportional to the logarithm of the instantaneous input signal. Likewise, the anti-logarithm circuit 51 may be any one of various well known types.

The multiplying and dividing means shown in multiplier 37 may be replaced by other types known in the art. For example, one type of multiplying circuit comprises balanced diodes in a so-called balanced modulator circuit. Other circuits for multiplying make use of multigrid amplifier tubes in which the output includes a component proportional to the product of the signals applied to each of two grids. In order to effectively divide by $Y_1$, a multiplying unit may be used to multiply by $1/Y_1$. The reciprocal of the signal $Y_1$ can be produced, for example, by reversing the polarity of $Y_1$, adding a D.-C. component, and then passing it through a circuit having amplitude non-linearity similar to the anti-logarithm circuits.

In describing the system of FIG. 1 an operating example was given wherein the image orthicon 14 is operated on the upper bend or knee of its characteristic, and it was assumed that the gamma was substantially constant. This is a satisfactory mode of operation. However, it may be advantageous to utilize the "halo" effect that is sometimes taken advantage of in black and white picture transmission to produce a picture with increased contrast in picture areas where abrupt changes in brightness occur. In transmitting with the "halo" effect, the image orthicon is operated past the knee of its characteristic with the result that the gamma varies with light on areas surrounding the point being scanned. This variation in gamma means that the luminance signal $Y_2$ will vary correspondingly, and that there cannot be a correct fixed gamma correction.

The correction circuit of FIG. 2 will provide the necessary correction when the system is using the "halo" effect. Under these conditions there are actually two errors in the luminance signal $Y_2$, one error being due to the fact that the sum of the color components is being gamma corrected, i.e., for example, $Y_2$ equals $$(.30R+.59G+.11B)^{1/2}$$

rather than $(.30R)^{1/2}+(.59G)^{1/2}+(.11R)^{1/2}$, the other error being due to variations in $Y_2$ because of variations in gamma. The correction circuit of FIG. 2 will correct for both errors since it does not distinguish between the different causes that make $Y_2$ depart from the color-ideal luminance signal $Y_1$.

What is claimed is:

1. In combination, three picture signal pickup tubes of the vidicon type characterized in that they have comparatively low resolution and a normally undesirable lag whereby a reproduced picture tends to smear when there is picture motion, means for deriving from the outputs of said vidicons a color subcarrier which carries color difference signals representative of a scene, a comparatively high resolution picture signal pickup tube, means for obtaining from said high resolution tube a brightness or luminance signal representative of the sum of the luminances of all of the picture color components of said scene, and means for adding said luminance signal to said color subcarrier to produce a combined signal representative of said scene.

2. In combination, three comparatively low resolution picture signal pickup tubes of the vidicon type each having a non-linear characteristic so as to provide at least part of a desired gamma correction, means for deriving from the outputs of said vidicons a color subcarrier which carries color difference signals representative of a scene, a comparatively high resolution picture signal pickup tube which has a non-linear characteristic so as to provide at least part of the desired gamma correction, means for obtaining from said high resolution tube a brightness or luminance signal representative of said scene, and means for adding said luminance signal to said color subcarrier to produce a combined signal representative of said scene.

3. In combination, three picture signal pickup tubes of the vidicon type, means for obtaining from said vidicons, respectively, red, green and blue picture component signals which are gamma corrected, means for deriving from said red, green and blue component signals a color subcarrier which carries color difference signals representative of a scene, a high resolution picture signal pickup tube, means for obtaining from said high resolution tube a gamma corrected brightness or luminance signal representative of the sum of the luminances of all of the picture color components of said scene, and means for adding said luminance signal to said color subcarrier to produce a combined signal representative of said scene.

4. In combination, three comparatively low resolution picture signal pickup tubes of the vidicon type, means for obtaining from said vidicons, respectively, red, green and blue picture component signals which are gamma corrected, means for deriving from said red, green and blue component signals a color subcarrier which carries color difference signals representative of a scene, a comparatively high resolution picture signal pickup tube, means for obtaining from said high resolution tube a gamma corrected brightness or luminance signal representative of said scene, and means for adding said luminance signal to said color subcarrier to produce a combined signal representative of said scene.

5. In combination, three picture signal pickup tubes of the vidicon type characterized in that they have a normally undesirable lag whereby a reproduced picture tends to smear when there is picture motion, means for obtaining from said vidicons, respectively, red, green and blue picture component signals which are gamma corrected, means for deriving from said red, green and blue component signals a color subcarrier which carries color difference signals representative of a scene, a high resolution picture signal pickup tube, a picture pickup optical system for said high resolution pickup tube, said optical system and said high resolution pickup tube in combination having a spectral response comparable to that of the human eye, means for obtaining from said high resolution tube a gamma corrected brightness or luminance signal representative of said scene, and means for adding said luminance signal to said color subcarrier to produce a combined signal representative of said scene.

6. In combination, three picture signal pickup tubes of the vidicon type characterized in that their signal outputs are substantially free from spurious shading signals, means for obtaining from said three vidicons, respectively, red, green and blue color component picture signals of a scene and for deriving from said color component signals a color subcarrier which carries color difference signals, a high resolution picture signal pickup tube characterized in that its signal output contains a substantial amount of spurious shading signals, means for obtaining from said high resolution tube of brightness or luminance signal representative of said scene, and means for adding said luminance signal to said color subcarrier to produce a combined signal representative of said scene.

7. In combination, three picture signal pickup tubes characterized in that their signal outputs are substantially free from spurious shading signals, means for obtaining from said three pickup tubes, respectively, red, green and blue gamma-corrected color component picture signals of comparatively low resolution of a scene and for deriving from said color component signals a color subcarrier which carries color difference signals, a high resolution picture signal pickup tube characterized in that its signal output contains a substantial amount of spurious shading signals, means for obtaining from said high resolution tube a gamma-corrected brightness or luminance signal representative of said scene, and means for adding said luminance signal to said color subcarrier to produce a combined signal representative of said scene.

8. In combination, three comparatively low resolution picture signal pickup tubes, means for obtaining from said pickup tubes, respectively, red, green and blue picture component signals which are gamma corrected, means for deriving from said red, green and blue component signals a color subcarrier $A_1$ which carries color difference signals representative of a scene, a comparatively high resolution picture signal pickup tube, means for obtaining from said high resolution tube a gamma-corrected brightness or luminance signal $Y_2$, said luminance signal being representative of the sum of the luminances of all the picture color components of said scene, means for adding said red, green and blue component signals in the correct proportions to produce at least an approximately color-ideal luminance signal $Y_1$, means for multiplying said color subcarrier $A_1$ by $Y_2/Y_1$ to obtain a corrected color subcarrier $A_2$, and means for adding said luminance signal $Y_2$ to said corrected color subcarrier $A_2$ to produce a combined signal representative of said scene.

9. In combination, three picture signal pickup tubes of the vidicon type, means for obtaining from said vidicons, respectively, red, green and blue picture component signals which are gamma corrected, means for deriving from said red, green and blue component signals a color subcarrier $A_1$ which carries a color difference signals representative of a scene, a high resolution picture signal pickup tube, means for obtaining from said high resolution tube a gamma-corrected brightness or luminance signal $Y_2$, said luminance signal being representative of said scene, means for adding said red, green and blue component signals in the correct proportions to produce at least an approximately color-ideal luminance signal $Y_1$, means for multiplying said color subcarrier $A_1$ by $Y_2/Y_1$ to obtain a corrected color subcarrier $A_2$, and means for adding said luminance signal $Y_2$ to said corrected color subcarrier $A_2$ to produce a combined signal representative of said scene.

10. In combination, three picture signal pickup tubes of the vidicon type, means for obtaining from said vidicons, respectively, red, green and blue picture component signals which are gamma corrected, means for deriving from said red, green and blue component signals a color subcarrier $A_1$ which carries color difference signals representative of a scene, a high resolution picture signal pickup tube, a picture pickup optical system for said high resolution pickup tube, said optical system and said high resolution tube having in combination a spectral response comparable to that of the human eye, means for obtaining from said high resolution tube a gamma-corrected brightness or luminance signal $Y_2$, said luminance signal being representative of said scene, means for adding said red, green and blue component signals in the correct proportions to produce at least an approximately color-ideal aluminance signal $Y_1$, means for multiplying said color subcarrier $A_1$ by $Y_2/Y_1$ to obtain a corrected color subcarrier $A_2$, and means for adding said luminance signal $Y_2$ to said corrected color subcarrier $A_2$ to produce a combined signal representative of said scene.

11. In combination, means for supplying red, green and blue picture component signals representative of a scene and at least an approximately color-ideal luminance signal $Y_1$ representative of said scene that are at least partially gamma corrected, means for deriving from said component signals a color subcarrier $A_1$ which carries color difference signals representative of said scene, means including a high resolution picture signal pickup tube for supplying a brightness or luminance signal $Y_2$ that is at least partially gamma corrected and is representative of said scene, means for multiplying said color subcarrier $A_1$ by $Y_2/Y_1$ to obtain a corrected color subcarrier $A_2$ and means for adding said luminance signal $Y_2$ to said corrected color subcarrier $A_2$ to produce a combined signal representative of said scene.

12. In combination, means comprising three picture signal pickup tubes for supplying, respectively, red green and blue component signals representative of a scene and at least an approximately color-ideal luminance signal $Y_1$ representative of said scene that are at least partially gamma corrected, means for deriving from said component signals a color subcarrier $A_1$ which carries color difference signals representative of said scene, means including a high resolution picture signal pickup tube for supplying a brightness or luminance signal $Y_2$ that is at least partially gamma corrected and is representative of said scene, means for multiplying said color subcarrier $A_1$ by $Y_2/Y_1$ to obtain a corrected color subcarrier $A_2$, and means for adding said luminance signal $Y_2$ to said corrected color subcarrier $A_2$ to produce a combined signal representative of said scene.

13. In combination, means for supplying red, green and blue picture component signals representative of a scene and at least an approximately color-ideal luminance signal $Y_1$ representative of said secene that are at least partially gamma corrected, means for deriving from said component signals a color subcarrier $A_1$ which carries color difference signals representative of said scene, a picture signal pickup tube of the image orthicon type, means operating said image orthicon on the upper bend of its characteristic for supplying a brightness or luminance signal $Y_2$ that is at least parially gamma corrected and is representative of said scene, means for multiplying said color subcarrier $A_1$ by $Y_2/Y_1$ to obtain a corrected color subcarrier $A_2$, and means for adding said luminance signal $Y_2$ to said corrected color subcarrier $A_2$ to produce a combined signal representative of said scene.

14. In combination, three picture signal pickup tubes of the type having a photoconductive target or screen that is to be scanned by an electron beam and which are characterized in that their signal outputs are substantially free from spurious shading, means for deriving from the outputs of said pickup tubes a color subcarrier which carries color difference signals representative of a scene, a high resolution picture signal pickup tube, means for obtaining from said high resolution tube a brightness or luminance signal representative of said scene, and means for adding said luminance signal to said color subcarrier to produce a combined signal representative of said scene.

15. In combination, means including a picture signal pickup tube for supplying a color component signal that is at least partially gamma corrected, means including a second picture signal pickup tube for supplying a different color component signal that is at least partially gamma corrected, means including a third picture signal pickup tube for supplying a still different color component signal that is at least partially gamma corrected, said picture signal pickup tubes being similar whereby they may be made to track in gamma and being of the type having a photoconductive target or screen that is to be scanned by an electron beam, color subcarrier producing means responsive to said signals for providing a color subcarrier which carries color difference signals representative of a scene, a high resolution picture signal pickup tube of the image orthicon type, means operating said high resolution tube on the upper knee of its characteristic and obtaining therefrom at least a partially gamma corrected brightness or luminance signal representative of said scene, and means for adding said luminance signal to said color subcarrier to produce a combined signal representative of said scene.

16. In combination, means including a picture signal pickup tube for supplying a red component signal that is at least partially gamma corrected, means including a second picture signal pickup tube for supplying a green component signal that is at least partially gamma corrected, means including a third picture signal pickup tube for supplying a blue component signal that is at least partially gamma corrected, said picture signal pickup tubes being of the type having a photoconductive target or screen that is to be scanned by an electron beam and which are characterized in that their signal outputs are substantially free from spurious shading, color subcarrier producing means responsive to said signals for providing a color subcarrier which carries color difference signals representative of a scene, a high resolution picture signal pickup tube of the image orthicon type, means operating said high resolution tube on the upper knee of its characteristic and obtaining therefrom at least a partially gamma corrected brightness or luminance signal representative of said scene, and means for adding said luminance signal to said color subcarrier to produce a combined signal representative of said scene.

17. In combination, three picture signal pickup tubes of the type having a photoconductive target or screen that is to be scaned by an electron beam and which are characterized in that their signal outputs are substantially free from spurious shading, means for obtaining from said pickup tubes, respectively, red, green and blue picture component signals, means at a point immediately following each pickup tube which supplies a signal that is at least partially gamma corrected which gamma correction may be provided at least in part by the pickup tube characteristic, color subcarrier producing means for deriving from picture component signals supplied thereto a color subcarrier which carries color difference signals representative of a scene, means supplying said red component signal from one of said points to said color subcarrier producing means, means supplying said green component signal from one of said points to said color subcarrier producing means, means supplying said blue component signal from the remaining one of said points to said color subcarrier producing means, a high resolution picture signal pickup tube, means for obtaining from said high resolution tube a brightness or luminance signal representative of the sum of the luminances of all of the picture color components of said scene, means at a point immediately following said high resolution pickup tube which supplies a signal that is at least partially gamma corrected which gamma correction may be provided at least in part by the high resolution tube characteristic, and means for adding said at least partially gamma corrected luminance signal to said color subcarrier to produce a combined signal representative of said scene.

References Cited by the Examiner

UNITED STATES PATENTS

| | | | |
|---|---|---|---|
| 2,672,072 | 3/54 | Sachtleben et al. | 178—5.4 X |
| 2,675,422 | 4/54 | Bedford | 178—5.4 |
| 2,858,362 | 10/58 | Bedford | 178—5.4 |

OTHER REFERENCES

Fink: "Television Engineering Handbook," McGraw-Hill Book Co., Inc., New York, 1957, pages 15–31.

DAVID G. REDINBAUGH, *Primary Examiner.*

ROBERT SEGAL, *Examiner.*